Figure 1:
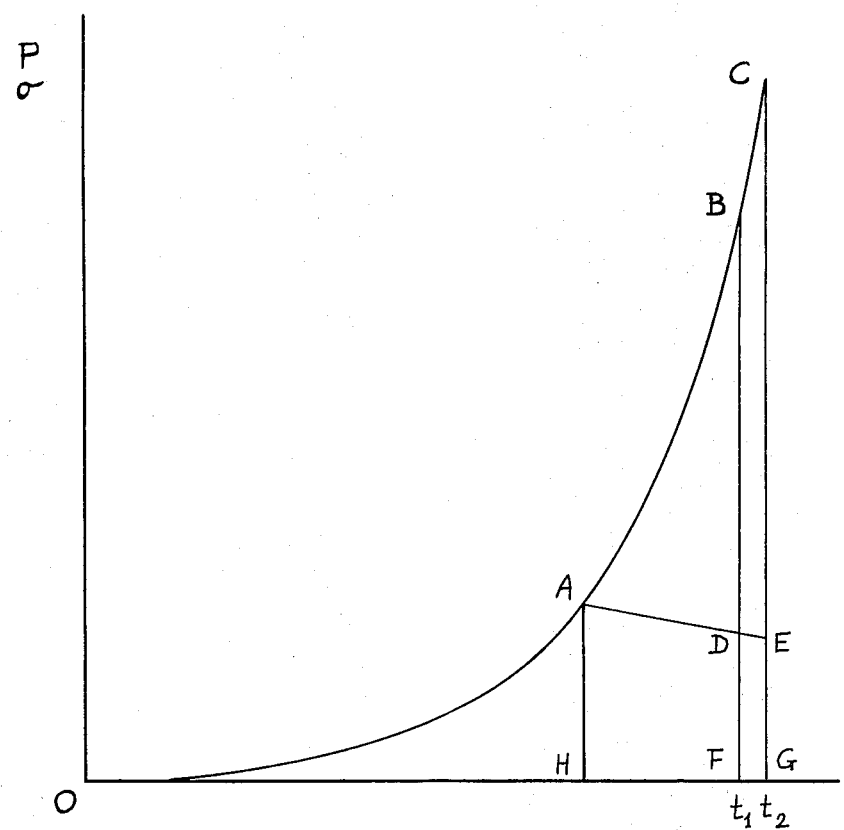

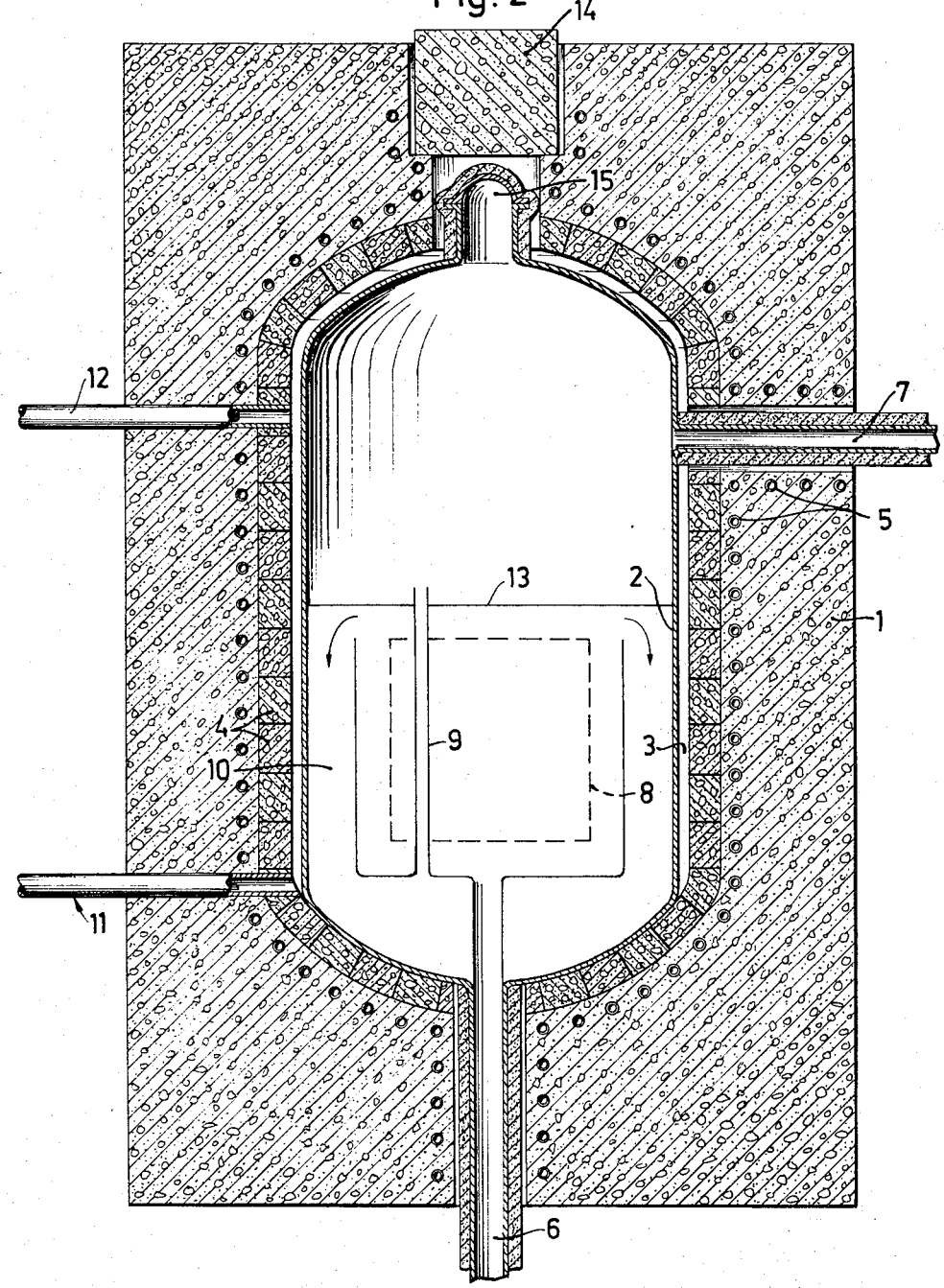

3,356,588
NUCLEAR REACTOR PRESSURE VESSEL AND METHOD OF CONSTRUCTING SAME

Karl Ivan Gunnar Beliaev, Saltsjobaden, Sweden, assignor to Aktiebolaget Atomenergi, Stockholm, Sweden, a company of Sweden
Filed Aug. 17, 1964, Ser. No. 390,090
Claims priority, application Sweden, Aug. 22, 1963, 9,178/63
4 Claims. (Cl. 176—87)

The invention relates to a nuclear reactor which is cooled by a pressurized fluid. More particularly the invention relates to improvements in the pressure vessel for such a nuclear reactor.

A large pressure vessel intended for a high interior pressure would necessitate a considerable wall thickness. It is known that the thickness of the wall can be reduced by placing the vessel within an outer pressure absorbing container which wholly or partly absorbs the work pressure. This outer container can for instance be a rock chamber or a vessel of prestressed concrete. The space between the inner and this outer vessel is filled with gas or a liquid which transmits the pressure from the inner to the outer vessel.

If the outer vessel is allowed to absorb the complete work pressure one can theoretically reduce the wall thickness of the inner vessel to a very small quantity. In practice it is not possible to reach this low quantity. This is because the inner vessel must have a certain stiffness, which necessitates a certain minimum thickness in the wall. The idea of the invention is to take advantage of the wall thickness of the inner vessel to absorb a significant part of the worked up pressure, while the rest of the pressure is absorbed by the outer vessel. This can be done without having to introduce a separate pressure transmitting gas or liquid into the space between the two vessels. The nuclear reactor of the invention is characterized in that the inner pressure vessel is so dimensioned as to fill the space between the two vessels while expanding elastically under increased pressure thus coming into contact with the outer vessel, which absorbs any further increase of pressure.

The invention assumes that the expansion elasticity of the inner vessel at an inner pressure is greater than that of the outer vessel at the same inner pressure, so that the expansion of the outer vessel due to pressure does not to any great extent influence the relative movements between the two vessels. It is convenient that the inner vessel be made of steel and the outer of prestressed concrete. To simplify matters in the description that follows the inner vessel will be termed the "steel vessel" and the outer vessel the "concrete vessel." Also for the sake of simplicity it is assumed also that the concrete vessel does not expand either due to pressure or heat.

The process of increasing the pressure from pressureless state to working state is not complicated if this takes place at a constant temperature. At first the pressure is completely absorbed by the steel vessel. After the steel vessel comes into contact with the concrete vessel the continued rise in the pressure will be completely absorbed by the concrete vessel, while the load on the steel vessel remains unchanged.

If, however, the temperature rises at the same time (which is usually true for a nuclear reactor) the process becomes somewhat more complicated, because the steel vessel expands partly due to the rise of pressure and partly due to the thermal expansion. A similar process will be explained in the following passage with reference to FIG. 1. Thereafter a nuclear reactor having a pressure vessel according to the invention will be described in FIG. 2.

FIG. 1 concerns a nuclear reactor where the pressure vessel contains two phases, namely, water and steam, the abscissa representing the temperature $t$, while the ordinate represents both the pressure P in the steel vessel as well as the tensile stress $\sigma$ produced by said pressure in the material composing the steel vessel and the concrete vessel. The curve OABC shows the relation between the temperature and the steam pressure in the steel vessel. When pressure and temperature are increased from cold, pressureless state the pressure is first completely absorbed by the steel vessel which expands elastically. When the pressure and the temperature have reached point A, the entire steel vessel comes into contact with the concrete vessel. The tensile stress in the material of the steel vessel is represented by the line AH. During the continued increase of pressure and temperature the concrete vessel will prevent further expansion of the steel vessel. This prevented expansion would give two kinds of results. Firstly, the continued increase of steam pressure along the curve AB will be entirely absorbed by the concrete vessel. Secondly, the continued thermal expansion in the steel vessel to work-temperature $t$, will give rise to an exterior pressure on the steel vessel. This exterior pressure reduces the tensile stress in the material of the steel vessel caused by the inner stream pressure. The result will be that the tensile stress in the steel will diminish as illustrated by the line AD. At a working temperature of $t_1$, the tensile stress in the steel vessel will therefore be represented by the line DF, while the tensile stress in the concrete vessel will be represented by the line BD.

If the working temperature is increased to $t_2$ the tensile stress in the steel vessel, as seen, will diminish to EG, while the tensile stress in the concrete vessel will increase to CE. By choosing in a suitable way the thickness of the wall in the steel vessel and the thickness of the space between the steel vessel and the concrete vessel it is possible to choose the desired maximum tensile stress of the steel vessel during the start-up and the shut-off (see line AH) and the tentile stress of the steel vessel during normal operation. (Line DF.)

FIG. 2 shows a vertical cross-section of a boiling reactor, in which heavy water is used as a cooler and a moderator. The figure is extremely simplified, as many details that are of no importance in regard to the invention have been omitted. An outer vessel 1 of prestressed concrete provided with a lid 14, contains a steel vessel 2 having a lid 15. The steel vessel rests with its bottom directly on the inner bottom of the concrete vessel, but is otherwise dimensioned in such a manner that a space 3 is formed, under cold and pressureless state, between the steel vessel and the concrete vessel. For reasons of clarity this space on the drawing has been shown in larger scale than in reality. Two tubes 11 and 12 reach into the space 3. Through these tubes it is possible to put the space 3 under slight vacuum and withdraw samples of the gas from the space 3, so as to determine that no radioactive products have leaked out of the steel vessel and also in order to prevent leakage from the space 3 to the surrounding area through the concrete vessel. It is also possible to circulate the gas in the space 3 through the pipes 11 and 12, if desired, and to supply additional gas through either of said pipes so as to keep a predetermined pressure in the space 3, if desired.

To protect the concrete and the pre-stressing cables against heat the inner wall of the concrete vessel is lined with concrete blocks 4 which act as insulators. The blocks are separated from each other by narrow spaces whereby they are not exposed to heat stresses. Furthermore, tubes 5 for cooling water are provided in the concrete near the inner wall.

The steel vessel contains the reactor core 8. Feed water is supplied through a tube 6, flowing first upwards through the reactor core, where it acts as a moderator, after which it flows downwards into the cavity 10 between the core and the steel vessel, see arrows, and finally flows upwards through the fuel tubes 9 (for reasons of clarity only one has been drawn) where it is brought to boil. The steam produced is withdrawn through a pipe 7. The normal water level is indicated at 13.

The pipes 6 and 7 for feed water and steam are dimensioned to absorb the whole work pressure. These can therefore, in contrast to the steel vessel itself, be insulated from heat by a non-pressure-absorbing insulator, for example glass wool.

In the starting up of the reactor an elastic expansion of the steel vessel will take place until the whole steel vessel comes into contact with the inner wall of the concrete vessel, in other words until the point A in FIG. 1 has been reached. During the continued increase of pressure and temperature the steel tank will be unloaded somewhat, according to line AD in FIG. 1.

The steel vessel should have a wall which is thick enough to absorb a significant portion of the pressure of the pressurized coolant. The steel vessel should also be able to expand freely within the concrete vessel (i.e. before point A is reached). For facilitating such a free expansion it is advantageous to reduce the friction between the steel vessel and the concrete vessel by applying a lubricant on either or both of the walls of the two vessels, for instance graphite or molybdenum sulphide.

When constructing the pressure vessel according to the invention it is important to reach a good equality between the form of the steel vessel and that of the concrete vessel. To reach this equality the steel vessel should preferably be made a little smaller than its final size, after which the concrete vessel is built around the steel vessel with as exact dimensions as possible. After this the steel vessel is exposed to an inner pressure, by means of a gas or a liquid, which is so high that the yield point of the steel is exceeded. At the same time the temperature is regulated to stay at a well-defined temperature which is lower than the desired work temperature. When the yield point is exceeded the steel undergoes a plastic deformation (cold-drawing) until the steel vessel has expanded to such an extent that it touches the concrete vessel all around. Thereafter the pressure and the temperature is reduced, which causes the steel vessel to contract under elastic and thermal deformation so that a well defined clearance is established between the steel vessel and the concrete vessel. When the pressure then is increased during start-up to the normal work temperature, the steel vessel comes into contact with the concrete vessel before the yield point of the steel has been reached. The margin to the yield point has then been determined by the temperature at which the cold drawing has been done.

It should be observed that the transmitting of the pressure from the steel vessel to the concrete vessel is carried out entirely automatically due to the expansion of the steel vessel. In the reactor mentioned in the beginning of this specification where a gas or a liquid transmits the pressure from the inner to the outer vessel the pressure in this gas or liquid must be regulated by means of a separate auxiliary apparatus.

To demonstrate the decrease of the thickness of the wall in the steel vessel and/or the concrete vessel which is made possible through the invention the following example is given: A reactor is working at a temperature of 298° C. and at a pressure of 85 bar. The diameter of the reactor vessel is 8 meters. If this reactor vessel is constructed as a steel vessel that absorbs the entire working pressure it must have a wall thickness of 85 millimetres. If the steel vessel is contained within a concrete vessel dimensioned to absorb the entire working pressure, the concrete vessel must have a wall thickness of 4.6 meters. Although the steel vessel then can be completely released of pressure it must all the same have a wall thickness of approximately 30 millimetres in order to be handled at all. If instead this steel vessel is utilized according to the invention to absorb a part of the working pressure, the steel vessel may absorb a pressure of approximately 30 bar while the concrete vessel will consequently absorb the remaining pressure. This necessitates a thickness of approximately 3 metres in the wall of the concrete vessel.

The concrete vessel acts at the same time as a biological radiation shield for the reactor.

What I claim is:

1. A nuclear reactor adapted to be cooled by a pressurized fluid, comprising an inner pressure vessel and an outer pressure vessel defining a space between the two pressure vessels in the pressureless state, said two pressure vessels being capable of absorbing, in combination, the total pressure of the pressurized fluid, said pressure vessels being so dimensioned that said inner pressure vessel will fill said space when subjected to a substantial part of said total pressure, thus coming into contact with the outer pressure vessel which will absorb any further increase of pressure.

2. A nuclear reactor adapted to be cooled by a pressurized fluid comprising an inner pressure vessel of steel and an outer pressure vessel of pre-stressed concrete, said vessels when acting together being capable of absorbing the total pressure of the pressurized fluid, said vessels being so dimensioned that in the pressureless state there is a space between the outer surface of the inner vessel and the inner surface of the outer vessel and that when said inner vessel is subjected to only a substantial part of said total pressure its outer surface is in contact with the inner surface of said outer vessel.

3. A nuclear reactor as claimed in claim 2 in which tubes for a cooling agent are embedded in the wall of the concrete vessel, close to the interior surface thereof.

4. A method of producing a well-defined space between the inner pressure vessel and the outer pressure vessel in the nuclear reactor having an inner pressure vessel of steel and an outer pressure vessel of pre-stressed concrete which comprises dimensioning the inner pressure vessel smaller than its final size, subjecting the inner pressure vessel to so high an inner pressure that the yield point of the steel is exceeded, said inner pressure vessel expanding under plastic deformation into contact with the outer pressure vessel, and finally releasing said inner pressure to produce an elastic contraction of the inner pressure vessel, said elastic contraction producing the desired well-defined space between the inner pressure vessel and the outer pressure vessel.

References Cited
UNITED STATES PATENTS

| | | |
|---|---|---|
| 2,807,581 | 9/1957 | Fermi et al. |
| 2,997,435 | 8/1961 | Millar et al. |
| 3,047,485 | 7/1962 | Ellis _____ 176—87 X |
| 3,075,910 | 1/1963 | Taylor. |
| 3,205,145 | 9/1965 | Margen. |

FOREIGN PATENTS 228,433  10/1959  Australia.

REUBEN EPSTEIN, *Primary Examiner.*